US010475008B1

(12) United States Patent
Gedrich et al.

(10) Patent No.: US 10,475,008 B1
(45) Date of Patent: Nov. 12, 2019

(54) ENHANCED GRAPHICAL USER INTERFACES

(71) Applicant: JPMorgan Chase Bank, N.A., New York, NY (US)

(72) Inventors: Ronald Gedrich, Columbus, GA (US); Joseph Bradley Nolan, Albany, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1023 days.

(21) Appl. No.: 14/565,147

(22) Filed: Dec. 9, 2014

(51) Int. Cl.
| | |
|---|---|
| *G06F 3/048* | (2013.01) |
| *G06Q 20/10* | (2012.01) |
| *G06F 3/0482* | (2013.01) |
| *G06F 3/0484* | (2013.01) |

(52) U.S. Cl.
CPC ....... *G06Q 20/1085* (2013.01); *G06F 3/0482* (2013.01); *G06F 3/04842* (2013.01)

(58) Field of Classification Search
CPC ...... G07F 19/20; G07F 19/206; G07F 19/201; G07F 19/211; G07F 19/205; G07F 7/08; G07F 19/203; G07F 7/04; G07F 17/3241; G07F 19/202; G07F 19/209; G07F 17/32; G07F 17/3223; G07F 17/3225; G07F 17/3237; G07F 17/3293; G07F 17/34; G07F 7/1008
See application file for complete search history.

(56) References Cited

U.S. PATENT DOCUMENTS

| | | | | |
|---|---|---|---|---|
| 7,637,421 | B1* | 12/2009 | Trocme | G06Q 40/02 235/379 |
| 2004/0001105 | A1* | 1/2004 | Chew | G06F 3/0482 715/817 |
| 2007/0235523 | A1* | 10/2007 | Clements | G06Q 20/06 235/379 |
| 2009/0034931 | A1* | 2/2009 | Stone | G11B 19/025 386/239 |
| 2009/0112709 | A1* | 4/2009 | Barhydt | G06Q 20/10 705/14.27 |
| 2011/0072373 | A1* | 3/2011 | Yuki | G06F 3/04817 715/764 |
| 2014/0040834 | A1* | 2/2014 | Thompson | G06F 3/0481 715/856 |
| 2014/0325449 | A1* | 10/2014 | Long | H04M 1/274525 715/835 |

\* cited by examiner

*Primary Examiner* — Di Xiao
(74) *Attorney, Agent, or Firm* — Greenberg Traurig LLP (57) ABSTRACT

Enhanced graphical user interfaces and methods for interacting with graphical user interfaces are disclosed. According to one embodiment, a method may include: (1) receiving a selection of a transaction from a user; (2) presenting a first selection row comprising first selection row options associated with the selected transaction; (3) receiving a selection of one of the first selection row options; (4) presenting a second selection row comprising second selection row options; (5) receiving a selection of one of the second selection row options; (6) receiving an indication to execute the transaction using the selected first selection row option and the selected second selection row option; and (7) executing the transaction using the selected first selection row option and the selected second selection row option. The first selection row and the second selection row may remain presented on the display screen until the indication to execute the transaction is received.

2 Claims, 10 Drawing Sheets

ENHANCED GRAPHICAL USER INTERFACES

BACKGROUND OF THE INVENTION

1. Field of the Invention

The present invention generally relates to enhanced graphical user interfaces.

2. Description of the Related Art

Automated teller machines (ATMs) and other banking kiosks are ubiquitous and have become a part of the way that individuals bank. Despite this, interfaces remain slow and counter-intuitive.

SUMMARY OF THE INVENTION

Enhanced kiosk interfaces are disclosed and methods for interacting with graphical user interfaces are disclosed.

In one embodiment, a method for interacting with a graphical user interface may include: (1) receiving a selection of a transaction from a user; (2) presenting a first selection row comprising a plurality of first selection row options associated with the selected transaction on a display screen; (3) receiving a selection of one of the first selection row options from the user; (4) presenting a second selection row comprising a plurality of second selection row options associated with the selected first selection row option on the display screen; (5) receiving a selection of one of the second selection row options from the user; (6) receiving an indication to execute the transaction using the selected first selection row option and the selected second selection row option; and (7) at least one computer processor executing the transaction using the selected first selection row option and the selected second selection row option. The first selection row and the second selection row may remain presented on the display screen until the indication to execute the transaction is received.

In one embodiment, the method may further include presenting a third selection row comprising a plurality of third selection row options associated with the selected second selection row option on the display screen; and receiving a selection of one of the third selection row options from the user. The at least one computer processor may execute the transaction using the selected first selection row option, the selected second selection row option, and the third selection row option.

In one embodiment, the selected first selection row option and the second selection row option are highlighted after each is selected.

In one embodiment, the transaction may be a banking transaction. In one embodiment, the banking transaction is a withdrawal transaction, and each of the first selection row options identifies a source account, and each of the second selection row options identifies an amount.

In one embodiment, the banking transaction may be a payment transaction, and each of the first selection row options identifies a pay to account, and herein each of the second selection row options identifies a source account.

In one embodiment, the banking transaction may be a transfer transaction, and each of the first selection row options identifies a source account, and each of the second selection row options identifies a destination account.

According to another embodiment, a method for interacting with a graphical user interface may include: (1) receiving a selection of a deposit transaction from a user; (2) presenting a first selection row comprising a plurality of destination account options on a display screen; (3) receiving a selection of one of the destination account options from the user; (4) presenting deposit instructions to the user on a second row; (5) receiving funds from the user; (6) presenting a received funds summary to the user; (7) receiving an indication to deposit the received funds to the selected account; and (8) at least one computer processor effecting the deposit to the selected account. The first selection row, the deposit instructions, and the received funds summary may remain displayed until after the indication to deposit the funds is received.

According to another embodiment, a method for interacting with a graphical user interface may include: (1) receiving a selection of a transaction from a user; (2) retrieving a user preferences for the selected transaction; (3) presenting a first selection row comprising a plurality of first selection row options associated with the selected transaction and a second selection row comprising a plurality of second selection row options on the display screen, wherein one of the first selection row options associated with the user preferences and one of the second selection row options associated with the user preferences is highlighted; (4) receiving an indication to execute the transaction using the selected first selection row option and the selected second selection row option; and (5) at least one computer processor executing the transaction using the highlighted first selection row option and the highlighted second selection row option. The first selection row and the second selection row may remain presented on the display screen until the indication to execute the transaction is received.

In one embodiment, the method may further include presenting a third selection row comprising a plurality of third selection row options, wherein one of the third selection row options associated with the user preferences is highlighted. The at least one computer processor may execute the transaction using the highlighted first selection row option, the highlighted second selection row option, and the highlighted third selection row option.

In one embodiment, the method may further include receiving a selection of one of the first selection row options other than the highlighted first selection row option; and highlighting the selected first selection row option.

In one embodiment, the method may further include receiving a selection of one of the second selection row options other than the highlighted first selection row option; and highlighting the selected second selection row option.

According to another embodiment, a method for receiving a user preference for a graphical user interface may include: (1) presenting a first selection row of first selection row options to a user on a display screen; (2) receiving a selection of one of the first selection row options from the user; (3) presenting a plurality of preference options associated with the selected first selection row option on the display screen; (4) receiving a selection of one of the preference options from the user; (5) receiving an indication to save the selected preference option; and (6) at least one computer processor saving the selected preference option. The first selection row and the plurality of preference options second selection row may remain presented on the display screen until the indication to save the selected preference option is received.

In one embodiment, the first selection row options may include a plurality of withdrawal amounts.

In one embodiment, the first selection row options may include a plurality of accounts.

According to another embodiment, a method for interacting with a graphical user interface may include: (1) presenting an active area on a display screen, the active area being smaller than the display screen; (2) presenting an upper button on a top of the active area and a lower button on a bottom of the active area; (3) receiving a selection of the button by a user touching the button; (4) moving the active area in the direction of the selected button; and (5) stopping the movement when the user releases the button.

In one embodiment, the upper button and/or the lower button extends the width of the display screen.

In one embodiment, an active area for the upper button and/or the lower button extends the width of the display screen.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-6.

The disclosures of the following U.S. Patents and U.S. Patent Applications are hereby incorporated, by reference, in their entireties: U.S. Pat. Nos. 7,099,850; 7,103,576; 7,783,578; 6,685,088; 7,448,538; and 7,657,489 and U.S. patent applications Ser. Nos. 11/398,281; 11/822,708; 12/421,915; 12/819,673; 12/914,288; 13/168,148; 13/918,190; 14/084,373; 61/585,057; 13/492,126; 13/456,818, 13/788,582, 61/745,151; 61/818,731; and 61/889,333.

The systems and method described herein improve the operation and functionality of the hardware. The systems and methods may increase the speed, ease of use, consistency, privacy and security of transactions.

Figure 1:
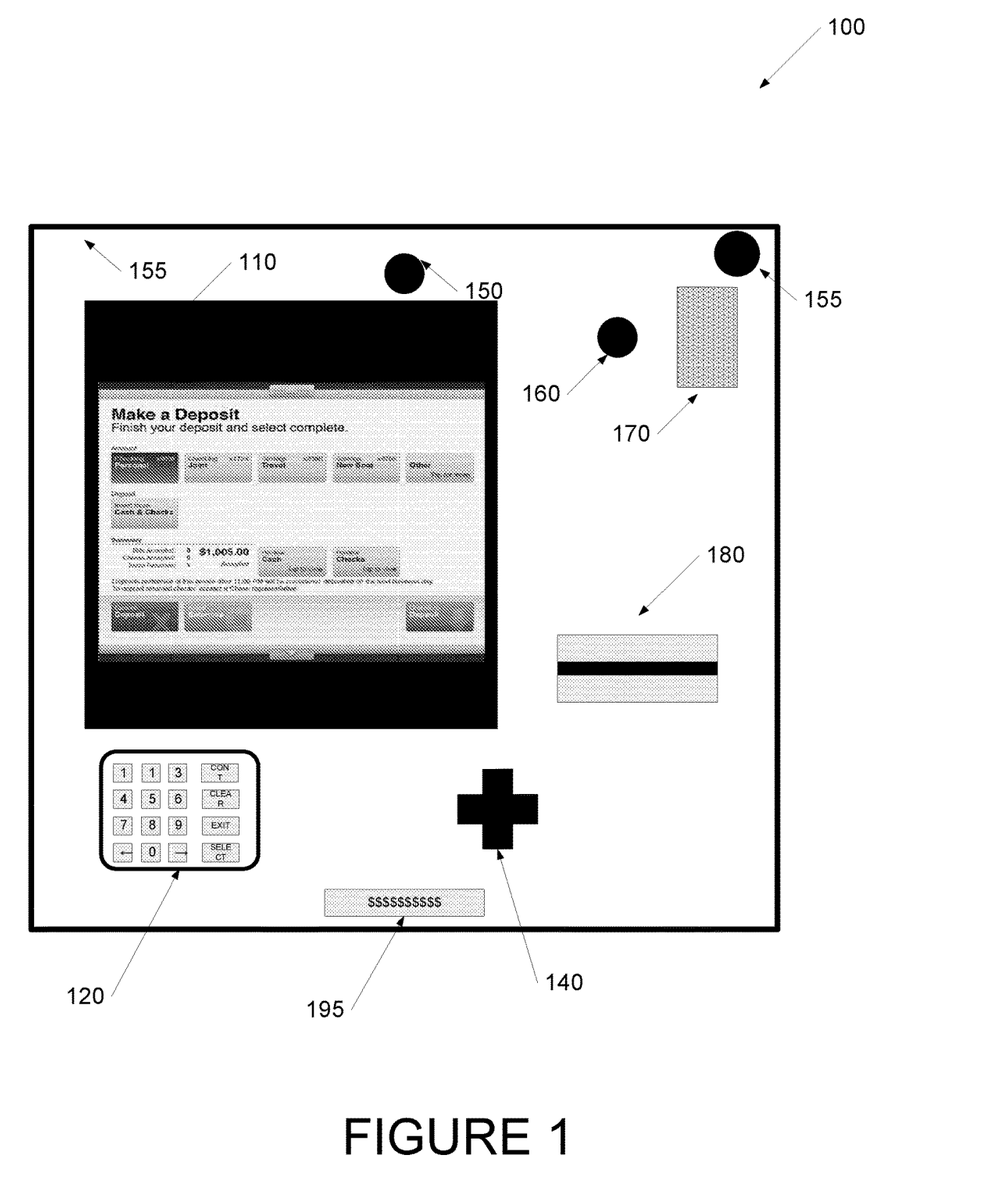
FIG. 1 is a block diagram of a kiosk according to one embodiment.

Referring to FIG. 1, a diagram of an automated teller machine with an improved interface is disclosed.

Kiosk 100 may include, for example, screen 110, keypad 110, touchpad 130, joystick/direction control 140 (e.g., trackball, joypad, etc.), etc.

In one embodiment, kiosk 100 may further include camera 150, microphone 160, speaker 170, and card slot 180. Various sensors 155, including, for example, height sensors, weight sensors, motion sensors, temperature sensors, etc. may be provided to detect the presence and/or physical characteristics of a customer.

Screen 110 may be any suitable screen, and may be a touch screen or a non-touch screen. In one embodiment, multiple screens may be provided as necessary and/or desired. In one embodiment, screen 110 may be movable, vertically and/or horizontally, to adjust to a proper sensed position for a customer using sensors 155.

An example of such a movable screen/display is provided in U.S. patent application Ser. No. 13/456,818, the disclosure of which is incorporated, by reference, in its entirety.

In one embodiment, screen 110 may be a holographic screen. For example, screen 110 may be provided on a platform that extends from, or pulls out from, the kiosk. A medium for a holographic image may be provided on the platform.

In another embodiment, screen 110 may be a three-dimensional ("3D") screen. The user may be required to wear special glasses in order to properly view the screen.

In one embodiment, sensor 155 may sense motions and gestures made by the user into the area where the screen or image is projected. In one embodiment, the user may not need to physically touch a screen to cause an action.

Keypad 110 may include a suitable number of keys to facilitate data entry. In one embodiment, keypad 110 may include 10 numeric keys (0-9), at least two directional keys, and a plurality of "action keys." As will be described in more detail below, in one embodiment, keypad 110 may be used to navigate the screen.

Input devices, including touchpad 130 and joystick/joypad 140 may be provided as necessary and/or desired. Additional input devices, including trackballs, mice, etc. may be provided as necessary and/or desired.

Any of the controls (e.g., keypad 110, touchpad 130, joystick 140, screen 110) may be positioned, oriented, etc. within kiosk 100 as necessary and/or desired to facilitate interaction with the customer.

In one embodiment, some or all of keypad 110, touchpad 130, and joystick 140 may be provided in a slide-out tray. In one embodiment, this tray may be activated upon entry of accessibility mode. In one embodiment, any or all of keypad 110, touchpad 130, and joystick 140 may be duplicated for the tray as necessary and/or desired.

In addition, any of keypad 110, touchpad 130, joystick 140, etc. may respond to the velocity of a customer's movements. For example, by the customer moving his or her fingers across the screen, touchpad, etc. more quickly, by holding down a key, by holding the joystick or joypad in one position, rotating the trackball quickly, etc. an indicator (e.g., a position indicator) on screen 110 may move more quickly.

In one embodiment, a round tracking device having a center button with a dial/scroller that has arrows too may be used. By the user moving his or her fingers faster, velocity may be detected.

Kiosk 100 may further include at least one camera 150, microphone 160 and speaker 170 for visually and audibly interacting with the customer. For example, in one embodiment, the camera may detect the presence of a customer at the kiosk, and may sense gestures, including sign language, motions, etc. In another embodiment, camera 150 may "read" the user's lips. Microphone 160 may receive audible commands from the customer, and speaker 170 may provide instructions and/or audible feedback to the customer.

In one embodiment, camera 150 may determine the location of a user and/or the user's extremities. For example, cameras 150 may be able to track the movement of the customer's hands so that it can provide guidance to a visually-impaired customer of the location of, for example, keypad 110, touchpad 130, joystick 140, cash recycler 195, or any other controls, features, or interfaces.

In one embodiment, camera 150 may track the user's eyes. For example, in one embodiment, the user may be able to navigate the displayed contents by moving his or her eyes to look at the feature that he or she would like to access. In another embodiment, Google Glass or a similar device may be used to track the user's eyes and navigate the contents.

Other interfaces, including TTY interfaces, may be provided as necessary and/or desired.

Figure 2:
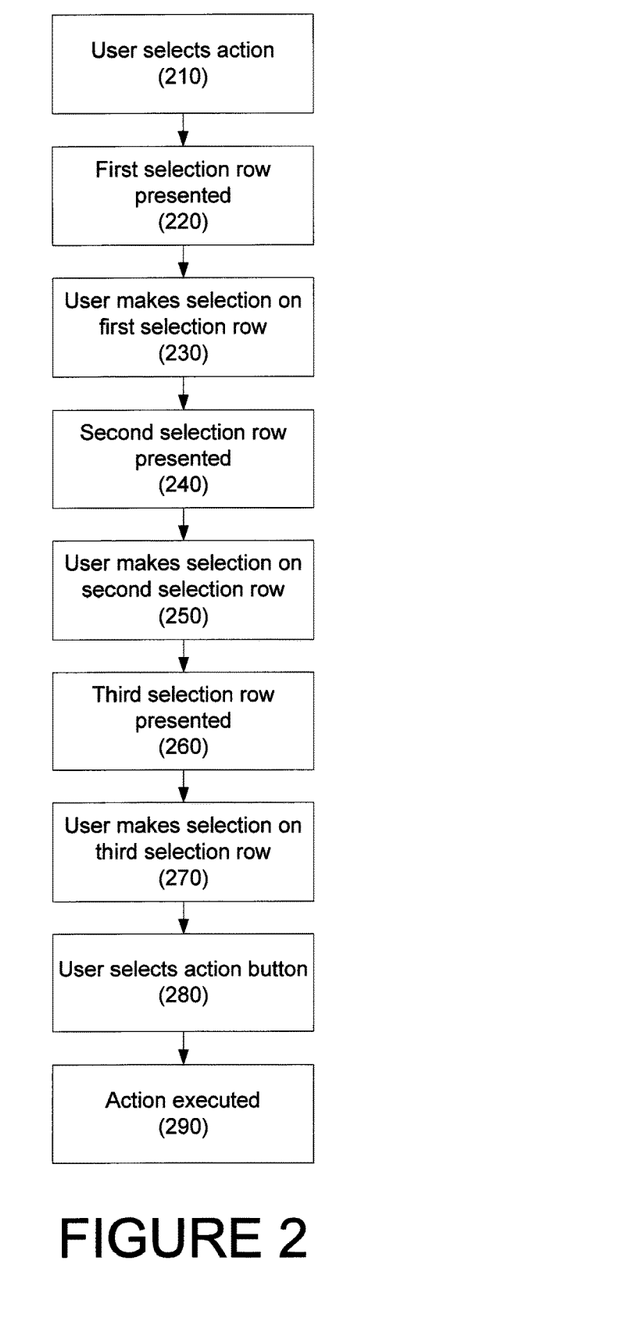
FIG. 2 is a flowchart depicting a method for kiosk interaction according to one embodiment.

Referring to FIG. 2, a flowchart depicting an "exposed path" is provided. "Exposed path" means that all steps in a transaction (e.g., select account, select amount, select denomination, get a receipt, etc.) are conveniently laid out, step-by-step, on one screen instead of several separate screens. For example, a typical "get cash" interface may involve thirteen screens, while the present "get cash" interface may involve two screens. This increases the speed of the kiosk and the transactions, data stores, and/or other user selections that are conducted using this interface.

As a selection from each selection row is made, the user's selection is highlighted and the next selection row is displayed. This process may continue until all selection rows are displayed and the user is instructed to execute the transaction.

In step 210, a user selects an action, such as "get cash," "transfer money," "make a payment," "make a deposit," etc. Other actions may be provided as necessary and/or desired.

Figure 3A:
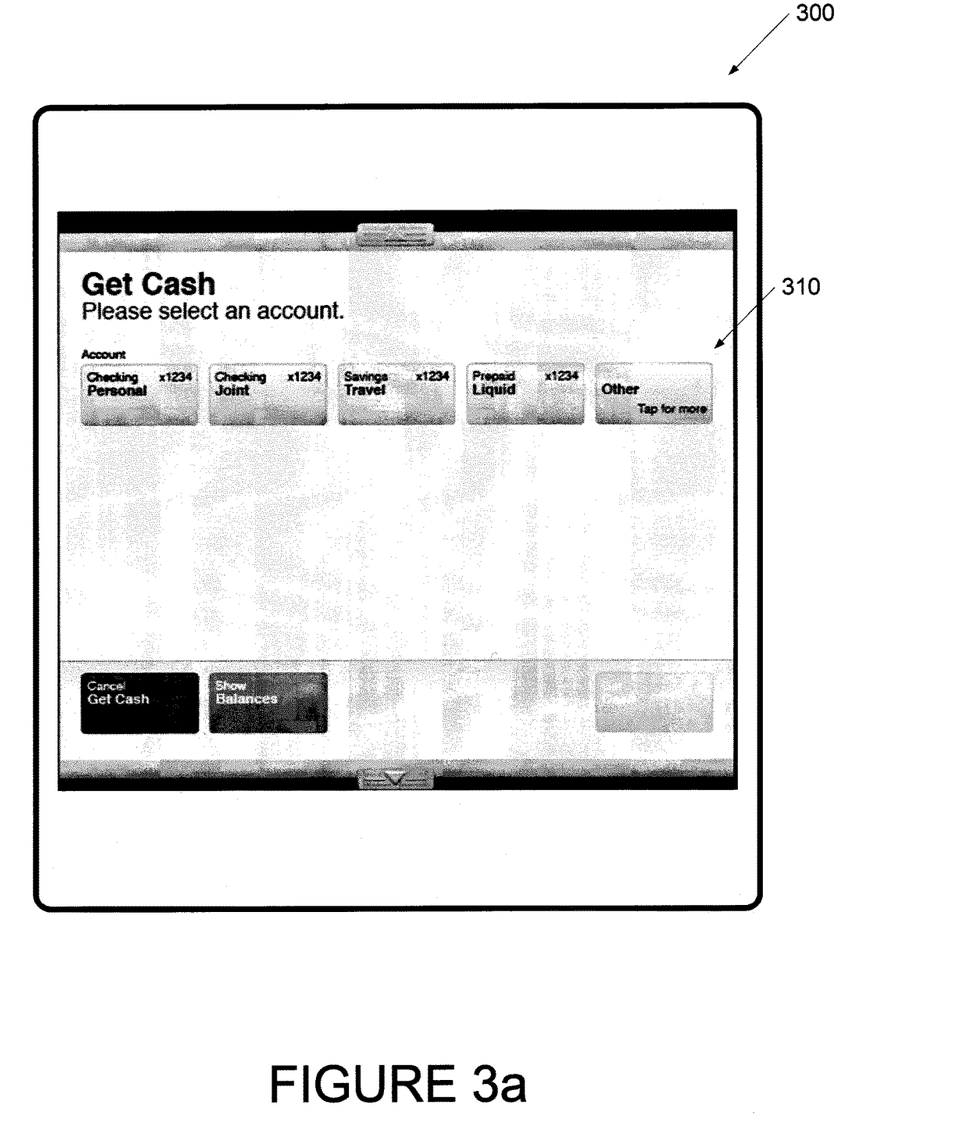
FIGS. 3a-3d are example screenshots of interfaces for kiosk interaction according to one embodiment.

In step 220, a first selection row may be presented. For example, for "get cash," the first selection row may be the selection of an account, such as personal checking, joint checking, savings, etc. In one embodiment, account balances may be displayed with the account. In one embodiment, a button may be provided to hide or show balances depending on what is desired. FIG. 3a depicts an exemplary interface 300 including first selection row 310 in the context of a "get cash" selection.

In one embodiment, the user's preferred (e.g., saved) or most popular selections may be highlighted when the selection row is presented. For example, one of the options may be highlighted in a different color, by being bolded, by shaking or having some other motion, etc. Despite the highlighting, the user may select any option in the selection row.

In step 230, the user may select an option from the first selection row.

In one embodiment, an "other" selection may be provided. The selection of the "other" button may open a modal window that may provide additional selections. In one embodiment, the modal window may include a "close window" or "return" option. The modal window may overlay the selection row from which the "other" was selected. Upon selection of one of the options in the modal window, the modal window may close and the "other' button may be populated with the selection from the modal window.

Figure 3B:
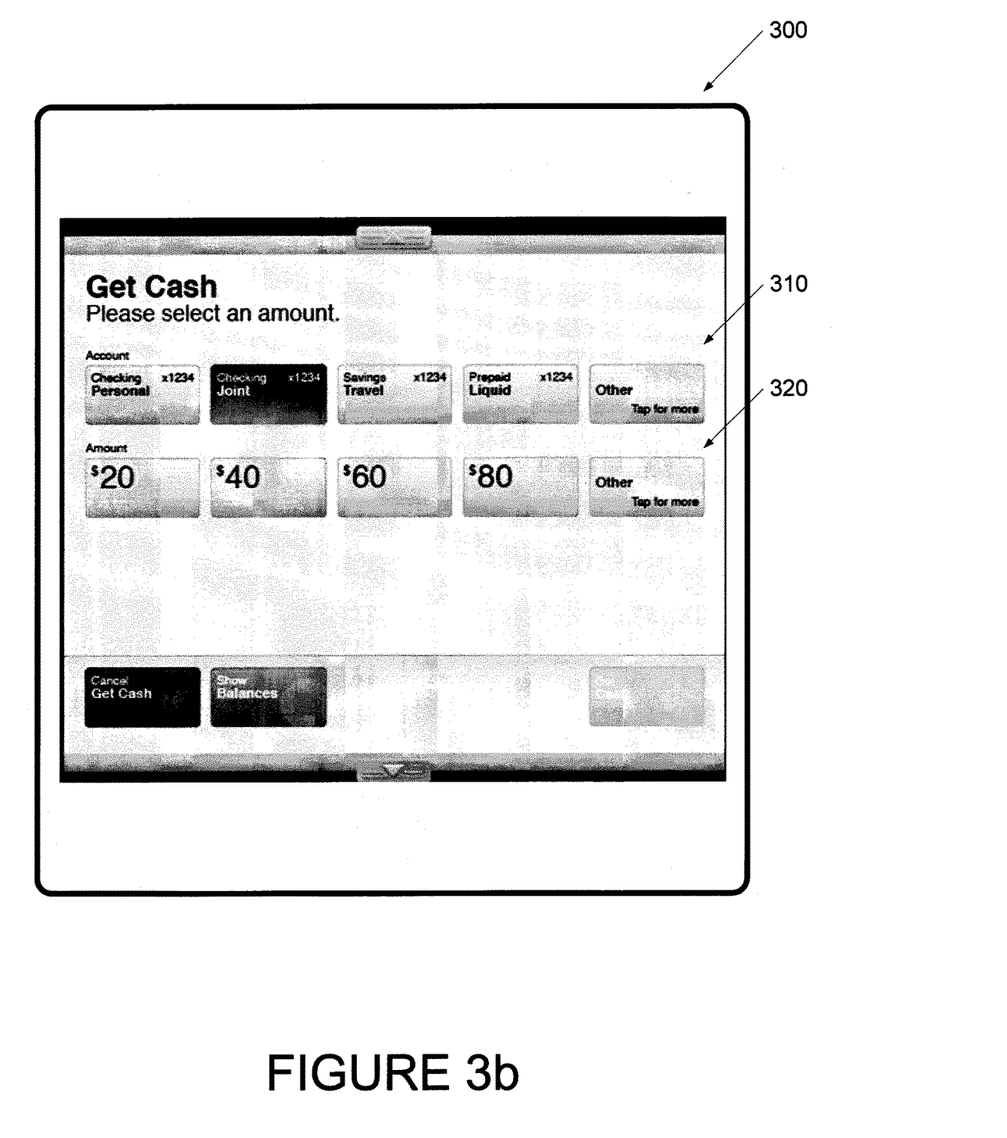

In step 240, a second selection row may be presented along with the first selection row. Although FIG. 3b depicts second selection row 320 below first selection row 310, it should be noted that any location may be selected as is necessary and/or desired. The user's most common selection or preferred selection for the second selection row may be highlighted as discussed above.

For example, for "get cash," the second selection row may be the selection of an amount.

In step 250, the user may select an option from the second selection row.

Figure 3C:
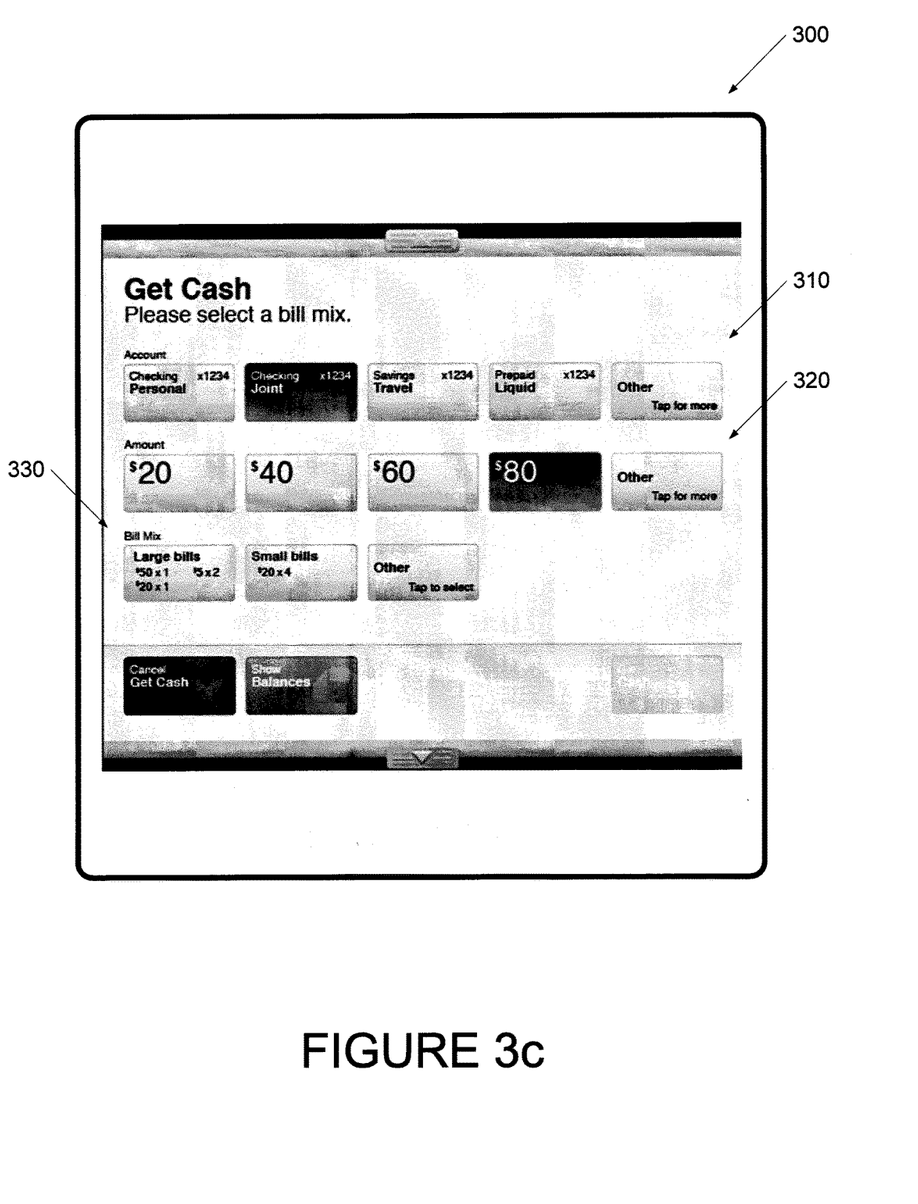

In step 260, a third selection row may be presented along with the first and second selection rows. Although FIG. 3c depicts third selection row 330 below second selection row 320, it should be noted that any location may be selected as is necessary and/or desired. The user's most common selection or preferred selection for the third selection row may be enhanced as discussed above.

For example, for "get cash," the third selection row may be the selection of an bill mix.

In step 270, the user may select an option from the third selection row.

Figure 3D:
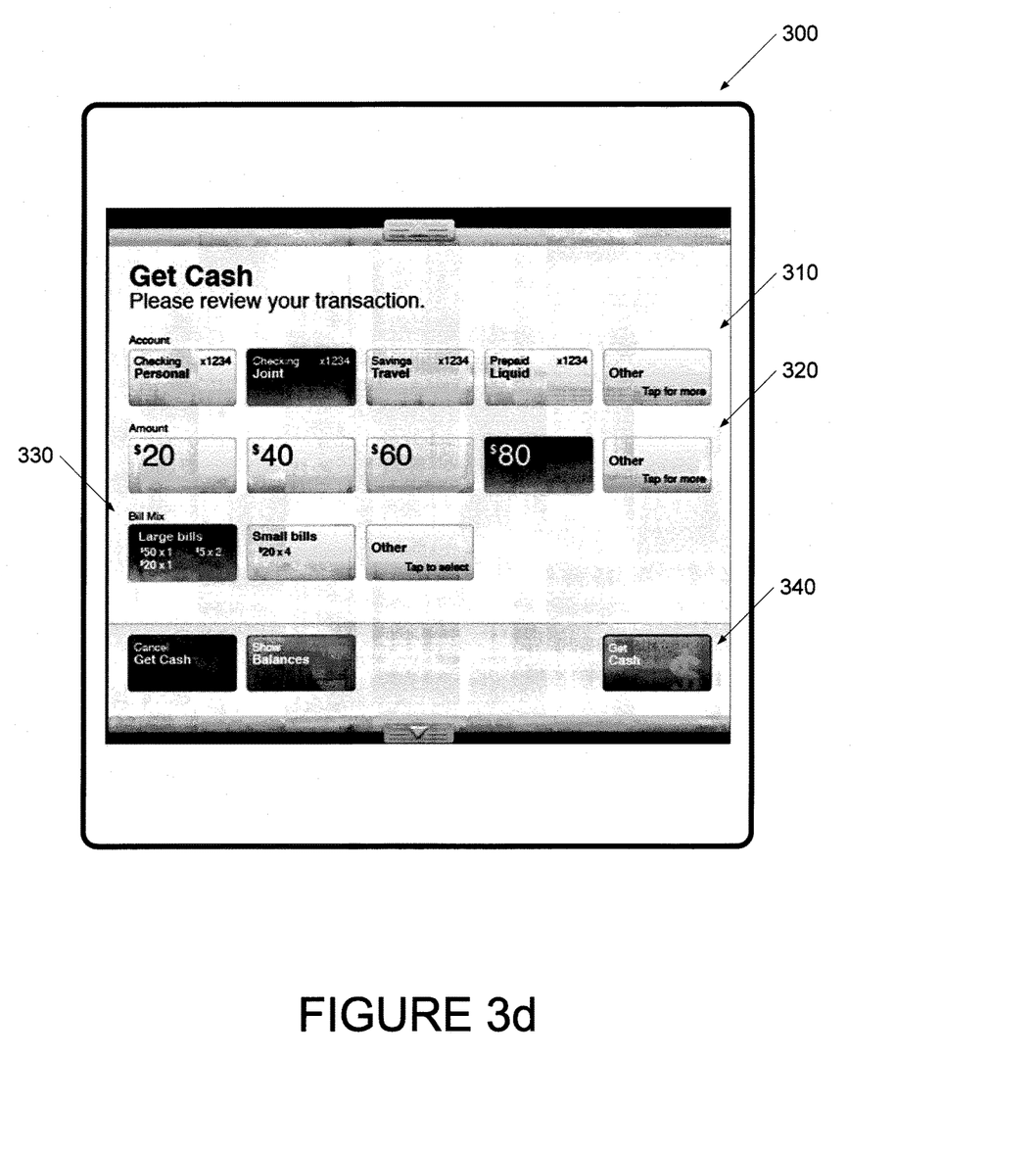

In step 280, the user may select an action button, such as "get cash" button 340 in FIG. 3d. In step 290, the action may be executed.

In one embodiment, after each selection, the user may be prompted to save the selection as a preference that may be highlighted during future interactions.

Although three selections rows have been described, it should be recognized that the number of selection rows, and the options available in each row, may vary as necessary and/or desired.

In one embodiment, rather than present each selection row individually with highlighted selections sequentially, all selection rows may be presented at the same time with the user's most common or preferred selections highlighted. The user may select the action button (e.g., "get cash") to execute the preferred selections.

Figure 4:
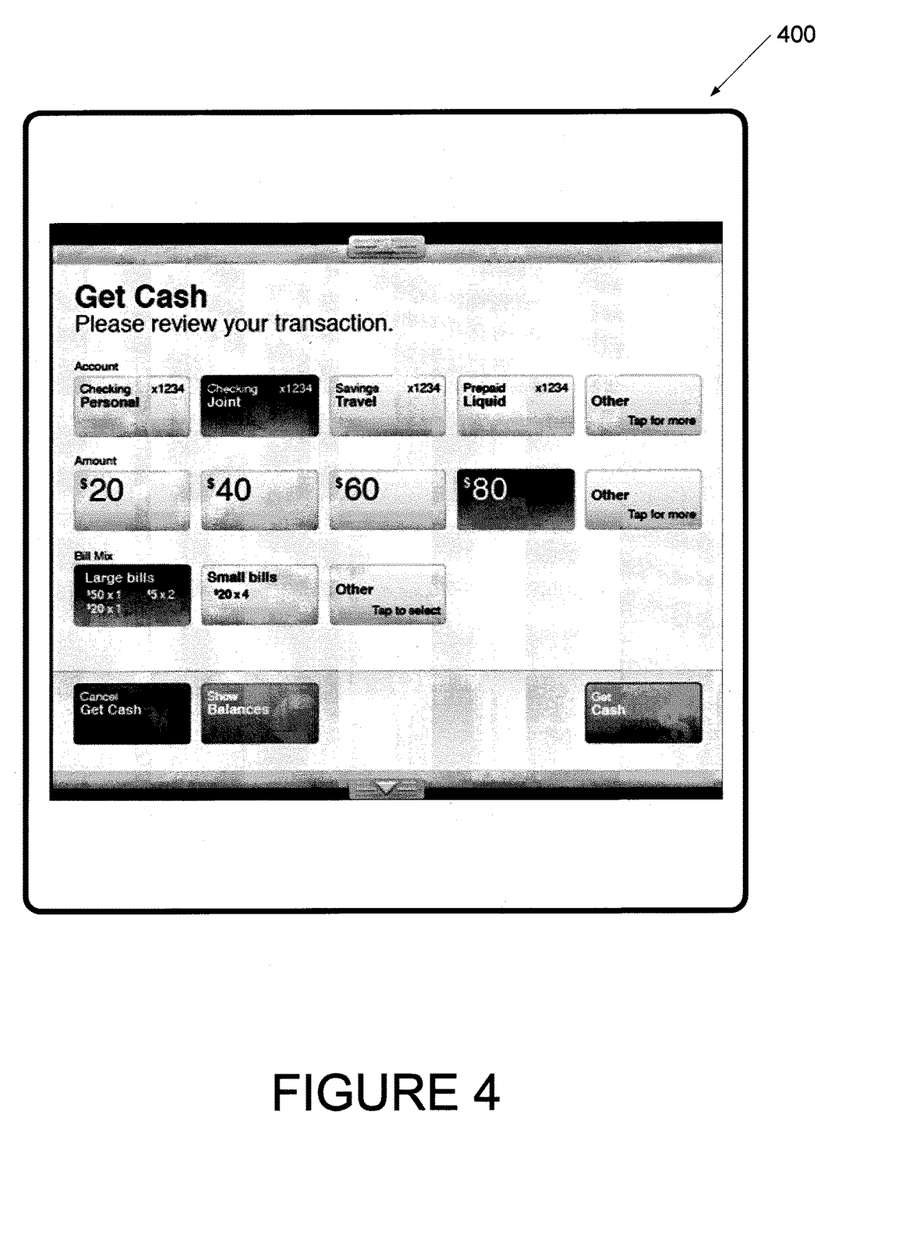
FIG. 4 is an example screenshot of an interface for kiosk interaction according to one embodiment.

FIG. 4 illustrates exemplary "illuminated path" interface 400.

Figure 5:
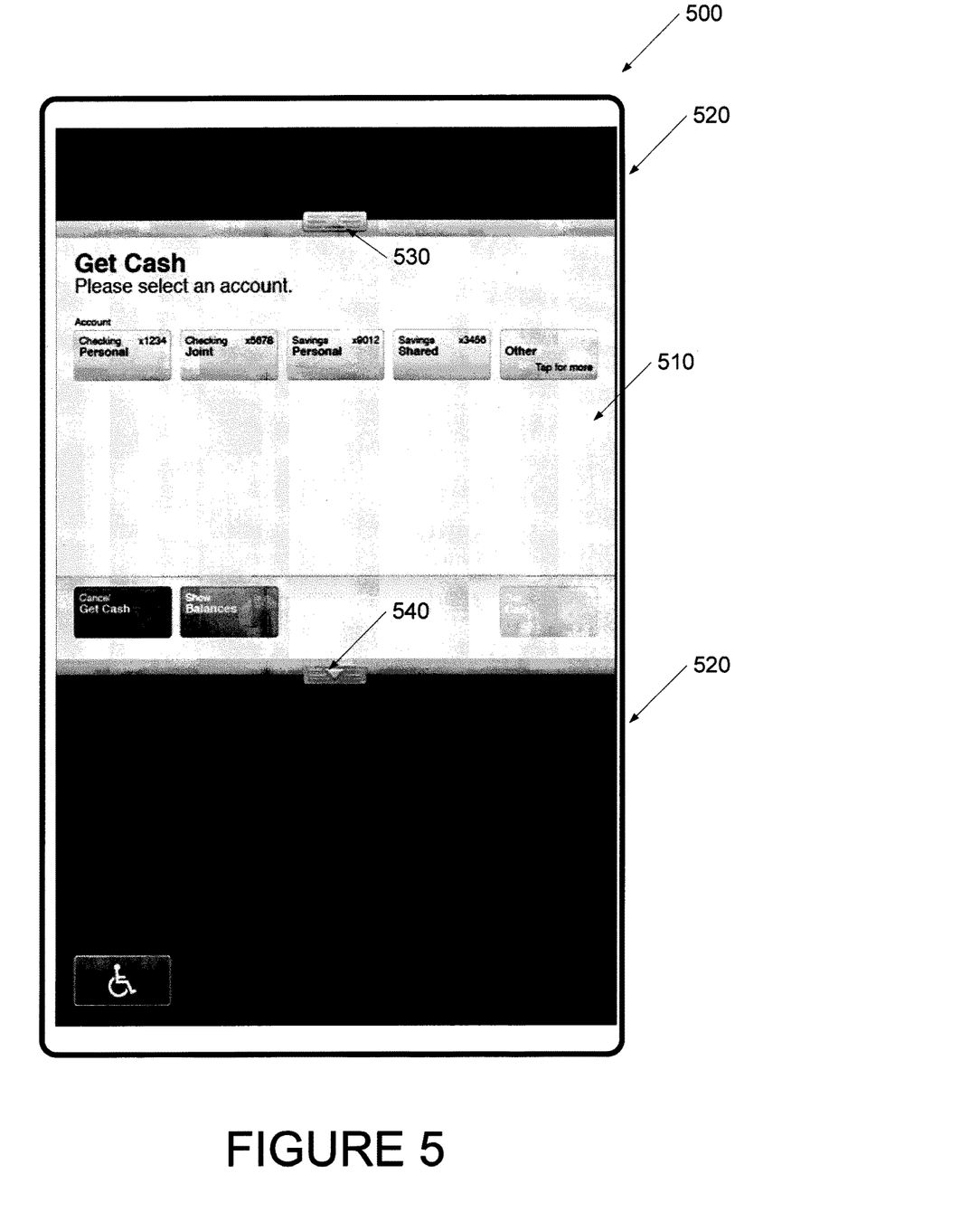
FIG. 5 is an example screenshot of an interface for kiosk interaction according to one embodiment.

Referring to FIG. 5, a "glide" interface is provided. A glide interface may be an immersive floating user interface that allows the user to move an active area of the interface to a desired position. For example, interface 500 may include a screen having active area 510 and inactive areas 520. Active area 510 may be an area in which information may be displayed to the user and in which the user may make selections.

In one embodiment, "grippers" 530 and 540 may be provided. In one embodiment, grippers 530 and 540 may be provided at the top and bottom of active area 510, respectively. Other locations (e.g., sides, edges, corners, in inactive area 520, etc.) may be provided as necessary and/or desired.

In one embodiment, when the user selects a gripper, the active area may "glide" in that direction. For example, when the user selects upper gripper 530, active area 510 may move upward. When the user selects lower gripper 540, active area may move downward. Although two grippers 530 and 540 are illustrated, it should be recognized that a greater or fewer number of grippers may be provided as is necessary and/or desired. In one embodiment, if active area 510 is positioned so that it cannot be moved in one direction (e.g., it is at the lowest position with no inactive area below it), then the gripper that is associated with moving the active area 510 in that direction may not be displayed.

Although active area 520 has been described as moving vertically, it should be recognized that active area 520 may move horizontally, diagonally, or, in a three-dimensional interface, depth-wise.

Figure 6A:
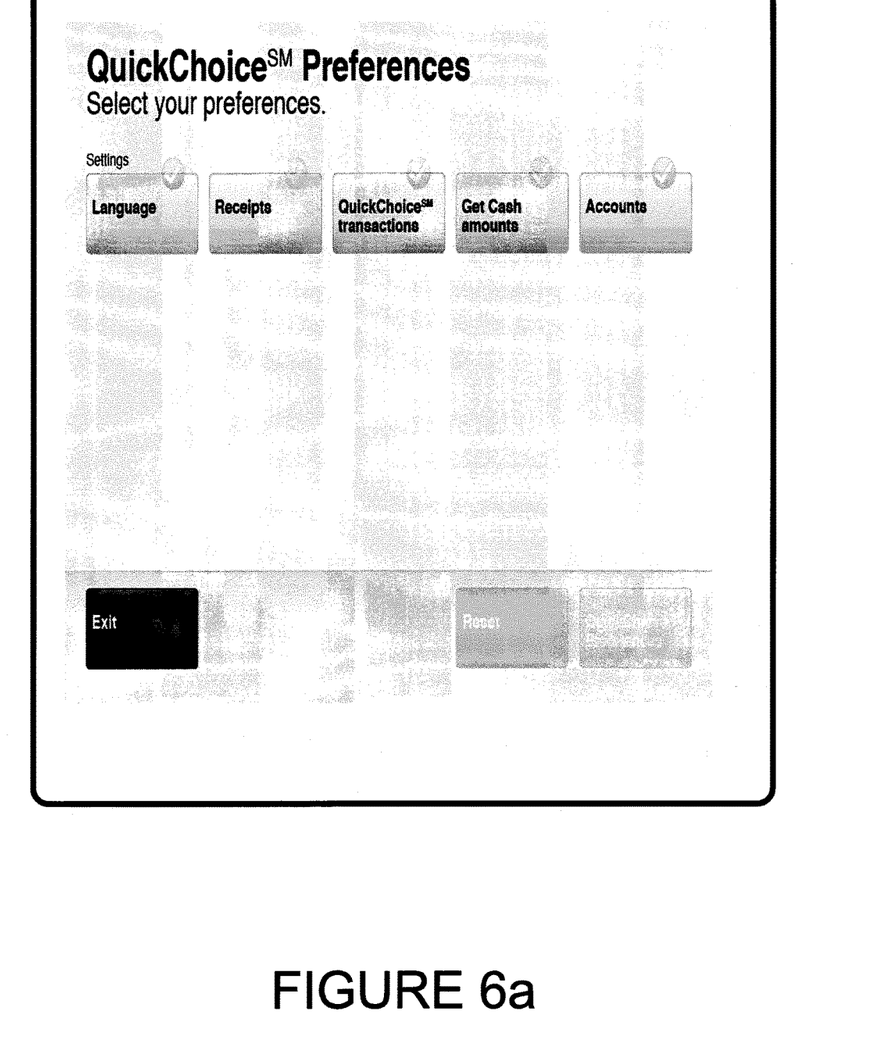
FIGS. 6a and 6b are example screenshots of an interface for kiosk interaction according to one embodiment.
Figure 6B:
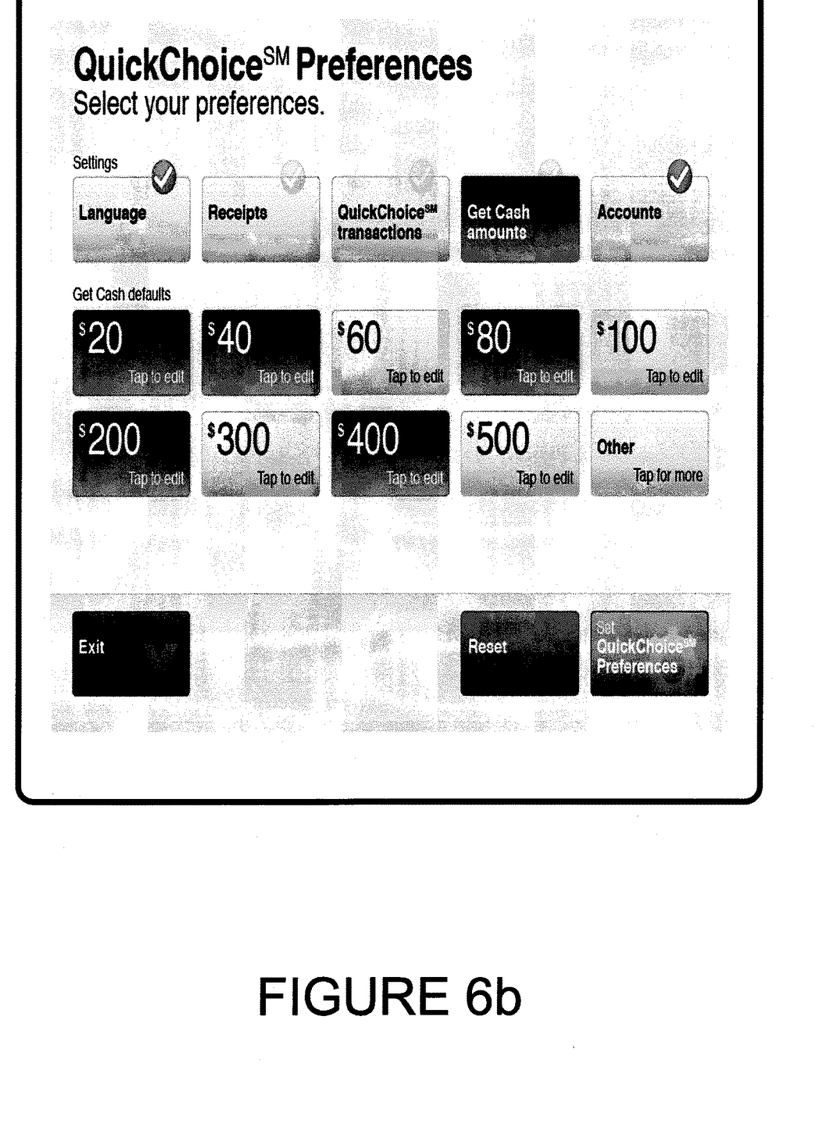

In one embodiment, a user may be able to customize many preferences including language default, account preferences, receipt preferences and favorite transactions. Referring to FIG. 6a, the user may be presented with a menu for setting quickchoice preferences. In FIG. 6b, the user may select his or her preferences. For example, the user may select preferences for "get cash amounts" by selecting an amount and selecting "set."

In one embodiment, the user may set preferences for the language to use, source and/or destination accounts, whether a receipt is to be provided, and the user's favorite transactions.

In one embodiment, the user may be presented with offers and messages. For example, a screen may present an option for the user to view offers and messages. By selecting this button, offers (e.g., discounts), messages (e.g., "Happy Birthday"), etc. may be presented. In one embodiment, the user may request contact from a specialist.

In one embodiment, a "sunlight" mode may be provided to maximize contrast for those that have difficulty seeing and in high-glare scenarios. In one embodiment, the sunglass mode may be automatically detected by a camera at the device; in another embodiment, it may be activated by a button selection. "Sunlight mode" may create a monochromatic interface to maximize contrast.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a special-purpose processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for interacting with a graphical user interface, comprising:
   in an automated teller machine comprising at least one computer processor and a touch-sensitive display screen:
      receiving a selection of a withdrawal transaction from a user on the touch-sensitive display screen, the withdrawal transaction comprising a dispensing of bills by a cash recycler;
      presenting a first selection row comprising a plurality of source account options associated with the selected withdrawal transaction on the touch-sensitive display screen;
      receiving a selection of one of the source account options from the user on the touch-sensitive display screen;
      presenting a second selection row comprising a plurality of amount options associated with the selected first selection row option on the touch-sensitive display screen;
      receiving a selection of one of the amount options from the user on the touch-sensitive display screen;
      presenting a third selection row comprising a plurality of bill mix options associated with the selected second selection row option on the touch-sensitive display screen;

receiving a selection of one of the bill mix options from the user on the touch-sensitive display screen;

receiving an indication to execute the transaction using the selected source account option, the selected amount option, and the bill mix option on the touch-sensitive display screen;

executing the transaction using the selected source account option, the selected amount option, and the bill mix option; and controlling the cash recycler to dispense bills in accordance with the selected amount option and the selected bill mix option;

wherein the first selection row and the second selection row remain presented on the touch-sensitive display screen, and the selected source account option and the selected amount option remain highlighted after each is selected until the indication to execute the withdrawal transaction is received.

2. An automated teller machine comprising:

at least one computer processor;

a touch-sensitive display screen; and a cash recycler;

wherein:

the touch sensitive display screen receives a selection of a withdrawal transaction from a user, the withdrawal transaction comprising a dispensing of bills by the cash recycler;

the touch sensitive display screen presents a first selection row comprising a plurality of source account options associated with the selected withdrawal transaction;

the touch sensitive display screen receives a selection of one of the source account options from the user;

the touch sensitive display screen presents a second selection row comprising a plurality of amount options associated with the selected first selection row option;

the touch-sensitive display screen receives a selection of one of the amount options from the user;

the touch-sensitive display screen presents a third selection row comprising a plurality of bill mix options associated with the selected second selection row option on the touch-sensitive display screen;

the touch-sensitive display screen receives a selection of one of the bill mix options from the user on the touch-sensitive display screen;

the touch-sensitive display screen receives an indication to execute the transaction using the selected source account option, the selected amount option, and the bill mix option;

the at least one computer processor executes the transaction using the selected source account option, the selected amount option, and the bill mix option; and the at least one computer processor controls the cash recycler to dispense bills in accordance with the selected amount option and the bill mix option;

wherein the first selection row and the second selection row remain presented on the touch-sensitive display screen, and the selected source account option and the selected amount option remain highlighted after each is selected until the indication to execute the withdrawal transaction is received.

\* \* \* \* \*